(12) United States Patent
Zhao et al.

(10) Patent No.: US 9,036,642 B2
(45) Date of Patent: May 19, 2015

(54) POINT-TO POINT BASED MULTICAST LABEL DISTRIBUTION PROTOCOL LOCAL PROTECTION SOLUTION

(71) Applicant: Futurewei Technologies, Co., Plano, TX (US)

(72) Inventors: Qianglin Quintin Zhao, Boxborough, MA (US); Ying Chen, Clearwater, FL (US)

(73) Assignee: Futurewei Technologies, Inc., Plano, TX (US)

( * ) Notice: Subject to any disclaimer, the term of this patent is extended or adjusted under 35 U.S.C. 154(b) by 196 days.

(21) Appl. No.: 13/648,087

(22) Filed: Oct. 9, 2012

(65) Prior Publication Data
US 2013/0089100 A1 Apr. 11, 2013

Related U.S. Application Data

(60) Provisional application No. 61/545,397, filed on Oct. 10, 2011.

(51) Int. Cl.
| | |
|---|---|
| H04L 12/28 | (2006.01) |
| H04L 12/723 | (2013.01) |
| H04L 12/703 | (2013.01) |
| H04L 12/761 | (2013.01) |
| H04L 12/707 | (2013.01) |

(52) U.S. Cl.
CPC .............. *H04L 45/507* (2013.01); *H04L 45/28* (2013.01); *H04L 45/16* (2013.01); *H04L 45/22* (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS 7,602,702 B1 * 10/2009 Aggarwal .................. 370/217
7,626,925 B1 * 12/2009 Sivabalan et al. ........... 370/228
(Continued)

OTHER PUBLICATIONS

Minei, I., Ed., et al., "Label Distribution Protocol Extensions for Point-to-Multipoint and Multipoint-to-Multipoint Label Switched Paths," draft-ietf-mpls-ldp-p2mp-15.txt, Aug. 4, 2011, 40 pages.

(Continued)

*Primary Examiner* — Jung-Jen Liu
(74) *Attorney, Agent, or Firm* — Conley Rose, P.C.; Grant Rodolph; William H. Deitrich (57) ABSTRACT

In one aspect, the disclosure includes an apparatus comprising a processor configured to receive node protection backup route data at an upstream node and determine at least one backup route to at least one merge point node of a protected link or node according to the node protection data. In another aspect, the disclosure includes an apparatus comprising a processor configured to: receive at an upstream component information from a downstream component, wherein the received information comprises one or more of the following data elements related to one or more merge point nodes of a protected node: a number of leaf nodes, a plurality of merge point node addresses, a plurality of merge point node label reserve times and a plurality of merge point node forwarding labels, and establish a backup tunnel at the upstream component using at least one of the data elements received from the downstream component.

13 Claims, 6 Drawing Sheets

(56) References Cited

U.S. PATENT DOCUMENTS

| | | |
|---|---|---|
| 2006/0159009 A1* | 7/2006 | Kim et al. .................... 370/216 |
| 2008/0019266 A1* | 1/2008 | Liu et al. ..................... 370/228 |
| 2011/0063972 A1* | 3/2011 | Muley et al. ................. 370/225 |
| 2011/0063973 A1* | 3/2011 | VenkataRaman et al. .... 370/228 |
| 2011/0110224 A1* | 5/2011 | Nakash ........................ 370/221 |
| 2012/0218884 A1* | 8/2012 | Kini et al. .................... 370/228 |
| 2012/0307644 A1* | 12/2012 | Gandhi et al. ................ 370/241 |

OTHER PUBLICATIONS

Wijnands, I.J., Ed., et al., "mLDP Node Protection," draft-wijanands-mpls-mldp-node-protection-01.txt, Jun. 25, 2012, 19 pages.

Zhao, Q., et al., "Protection Mechanisms for Label Distribution Protocol P2MP/MP2MP Label Switched Paths," draft-zhao-mpls-mldp-protections-02.txt, Mar. 13, 2012, 27 pages.

Zhao, Q., et al., "LDP Extension for Multi Topology Support," draft-ietf-mpls-ldp-multi-topology-00.txt, Oct. 7, 2011, 22 pages.

Zhao, Q., et al., "LDP Extensions for Multi Topology Routing," draft-ietf-mpls-ldp-multi-topology-04.txt, Jul. 16, 2012, 19 pages.

Bradner, S., "Key Words for Use in RFCs to Indicate Requirement Levels," RFC 2119, Mar. 1997, 3 pages.

Rosen, E., "Multiprotocol Label Switching Architecture," RFC 3031, Jan. 2001, 57 pages.

Andersson, Ed., et al., "LDP Architecture," RFC 5036, Oct. 2007, 127 pages.

Thomas, B., et al., "LDP Capabilities," RFC 5561, Jul. 2009, 13 pages.

Le Roux, Ed., et al., Requirements for Point-to-Multipoint Extensions to the Label Distribution Protocol, RFC 6348, Sep. 2011, 21 pages.

Wijanands, I.J., Ed., et al., "Label Distribution Protocol Extensions for Point-to-Multipoint and Multipoint-to-Multipoint Label Switched Paths," RFC 6388, Nov. 2011, 40 pages.

Atlas, A., et al., "Algorithms for Computing Maximally Redundant Tree for IP/LDP Fast-Reroute," draft-enyedi-rtgwg-mrt-frr-algorithm.01.txt, Mar. 12, 2012, 46 pages.

Atlas, A., et al., "Algorithms for Computing Maximally Redundant Trees for IP/LDP Fast-Reroute," draft-enyedi-rtgwg-mrt-frr-algorithm-00.txt, Oct. 24, 2011, 40 pages.

Atlas, A, Ed., et al., "An Architecture for IP/LDP Fast-Reroute Using Maximally Redundant Trees," draft-ietf-rtgwg-mrt-frr-architecture-00.txt, Jan. 26, 2012, 21 pages.

Atlas, A, Ed., et al., "An Architecture for IP/LDP Fast-Reroute Using Maximally Redundant Trees," draft-ietf-rtgwg-mrt-frr-architecture-01.txt, Mar. 12, 2012, 25 pages.

Zhao, Q., et al., "Protection Mechanisms for Label Distribution Protocol P2MP/MP2MP Label Switched Paths," draft-zhao-mpls-mldp-protections-01.txt, Nov. 23, 2011, 18 pages.

Zhao, Q., et al., "Protection Mechanisms for Label Distribution Protocol P2MP/MP2MP Label Switched Paths," draft-zhao-mpls-mldp-protections-00.txt, Oct. 24, 2011, 15 pages.

Wijnands, IJ., "Using Multipoint LDP When the Backbone Has No Route to the Root," RFC 6512, Feb. 2012, 12 pages.

Awduche, D., et al., "RSVP-TE: Extensions to RSVP for LSP Tunnels," RFC 3209, Dec. 2001, 62 pages.

Kini, S., et al., "MPLS Fast Re-Route Using Extensions to LDP," draft-kini-mpls-frr-ldp-01.txt, Jul. 11, 2011, 11 pages.

Bryant, S., et al., "MPLS-TP Linear Protection," draft-ietf-mpls-tp-linear-protection-09.txt, Aug. 3, 2011, 43 pages.

Chen, H., et al., "Extensions to RSVP-TE for P2MP LSP Ingress Local Protection," draft-chen-mpls-p2mp-ingress-protection-03.txt, Jul. 11, 2011, 12 pages.

Foreign Communication From A Counterpart Application, PCT Application PCT/US2012/059372, International Search Report dated Apr. 24, 2013, 4 pages.

Foreign Communication From A Counterpart Application, PCT Application PCT/US2012/059372, Written Opinion dated Apr. 24, 2013, 10 pages.

* cited by examiner

POINT-TO POINT BASED MULTICAST LABEL DISTRIBUTION PROTOCOL LOCAL PROTECTION SOLUTION

CROSS-REFERENCE TO RELATED APPLICATIONS

This application claims priority to U.S. Provisional Application Ser. No. 61/545,397, filed Oct. 10, 2011, filed by Qianglin Quintin Zhao, et al., titled "Point-To-Point Based Multicast Label Distribution Protocol Local Protection Solution," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Label Distribution Protocol (LDP) defines mechanisms for setting up Point-to-Point (P2P) and Multipoint-to-Point (MP2P) Label Switched Paths (LSPs) in a network. The set of LDP extensions for setting up P2MP or MP2MP LSPs may be referred to as multipoint LDP (mLDP), which may be specified in Internet Engineering Task Force (IETF) Request for Comments (RFC) 6388, titled "Label Distribution Protocol Extensions for Point-to-Multipoint and Multipoint-to-Multipoint Label Switched Paths," which is hereby incorporated by reference.

Service providers continue to deploy real-time multicast applications using mLDP across Multiprotocol Label Switching (MPLS) networks. There is a clear need to protect these real-time applications and to provide the shortest switching times in the event of failure. Protecting services may include the establishment of backup paths for link or node failure. Under such practices, traffic should transmit across the backup path once a failure has been detected on the primary path. Current solutions suffer several known problems, particularly with respect to efficiently timing the establishment and disestablishment of backup paths. A rapidly established backup path is preferable for data continuity. If the backup path is disestablished too quickly, the receiver experiences packet loss; if too slowly, package duplication results.

SUMMARY

In one aspect, the disclosure includes an apparatus comprising a processor configured to receive node protection backup route data at an upstream node and determine at least one backup route to at least one merge point node of a protected link or node according to the node protection data.

In another aspect, the disclosure includes an apparatus comprising a processor configured to: receive at an upstream component information from a downstream component, wherein the received information comprises one or more of the following data elements related to one or more merge point nodes of a protected node: a number of merge point nodes, a plurality of merge point node addresses, a plurality of merge point node label reserve times and a plurality of merge node forwarding labels, and establish a backup tunnel at the upstream component using at least one of the data elements received from the downstream component.

In yet another aspect, the disclosure includes a method of optimizing secondary forwarding path operations comprising: receiving at a Point of Local Repair (PLR) a fast re-routing (FRR) label mapping message associated with a merge point (MP), generating a backup forwarding LSP for a primary LSP, binding the backup forwarding LSP to the primary LSP, switching traffic to the backup forwarding LSP upon detection of failure of a protected node, and deleting the backup forwarding LSP when the backup forwarding LSP is not needed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods, apparatuses, and systems for employing a point-to-point (P2P) protection mechanism for P2MP LSP link/node protection. Prior to failure, a protected node (N) may provide its upstream PLR router with information regarding N's downstream node(s), also referred to herein as merge point(s). The PLR may identify the P2P backup tunnel(s) for the merge point(s) prior to link or node failure at N. Upon a link or node failure at N, the PLR may promptly begin forwarding traffic around failed node N to the merge point(s) through the backup P2P tunnel(s). Backup forwarding may cease and traffic to the merge point(s) may resume normal transmission on the new LSP once either (1) a timer at the PLR times out, or (2) the PLR receives a make before break (MBB) re-route completion message from the merge point(s). This process avoids breadth-first, depth-first or other backup path identification schemes as well as duplicative packet transmission and packet loss through late or early backup path disestablishment.

Figure 1:
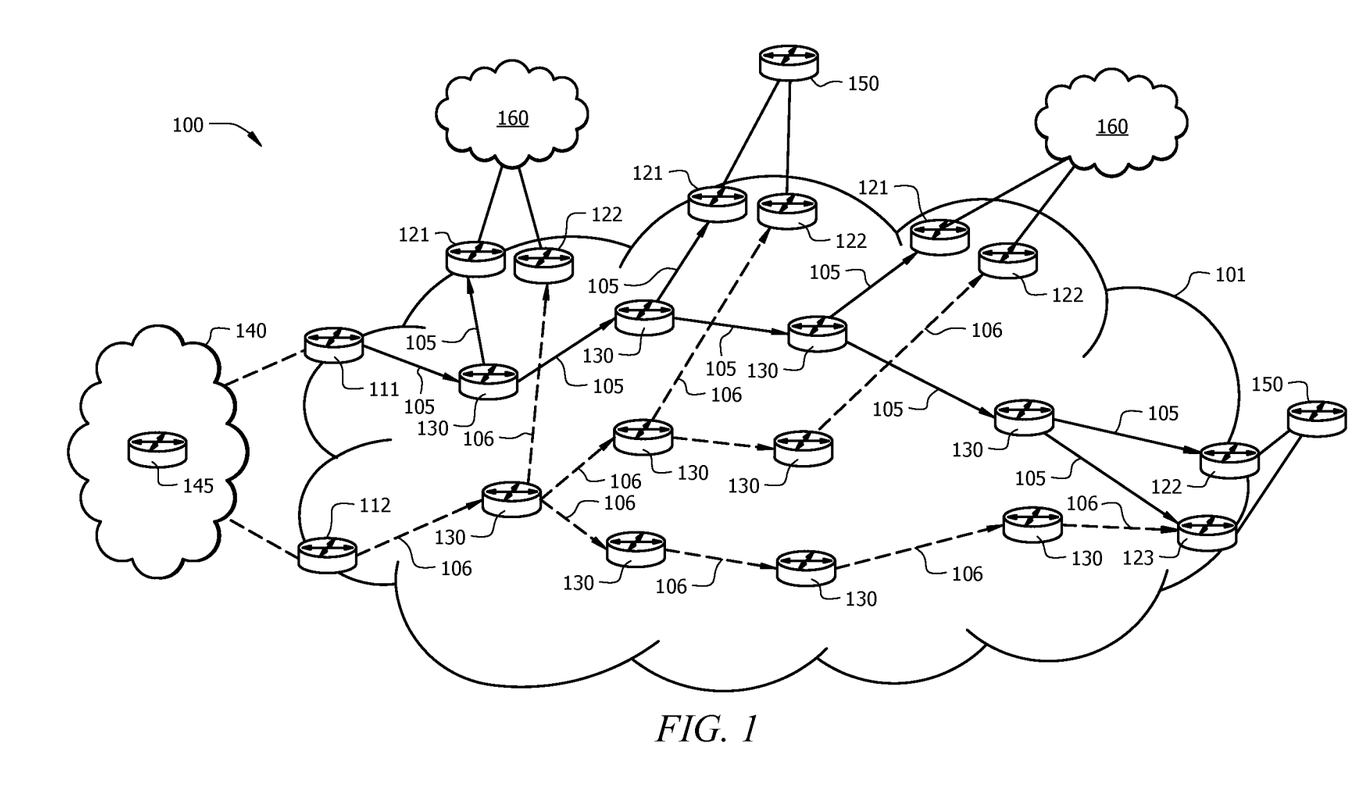
FIG. 1 depicts a schematic diagram of an embodiment of a label switched system.

FIG. 1 depicts one embodiment of a label switched system 100, where a plurality of P2P LSPs and P2MP LSPs may be established between at least some of the components. The P2P LSPs and P2MP LSPs may be used to transport data traffic, e.g., using packets and packet labels for routing and forwarding. The label switched system 100 may comprise a label switched network 101, which may be a packet switched network that transports data traffic using packets or frames along network paths or routes. The packets may be routed or switched along the paths, which may be established by a label switching protocol, such as MPLS or generalized MPLS (GMPLS).

The label switched network 101 may comprise a plurality of edge nodes, including a first ingress node 111, a second ingress node 112, a plurality of first egress nodes 121, and a plurality of second egress nodes 122. When a P2MP LSP in the label switched network 101 comprises ingress and egress edge nodes, the first ingress node 111 and second ingress node 112 may be referred to as root nodes or head nodes, and the first egress nodes 121 and second egress nodes 122 may be referred to as leaf nodes or tail end nodes. Additionally, the label switched network 101 may comprise a plurality of internal nodes 130, which may communicate with one another and with the edge nodes. The first ingress node 111 and the second ingress node 112 may communicate with a source node 145 at a first external network 140, such as an Internet Protocol (IP) network, which may be coupled to the label switched network 101. First egress nodes 121 and second egress nodes 122 may communication with destination nodes 150 or other networks 160. As such, the first ingress node 111 and the second ingress node 112 may transport data, e.g., data packets, from the external network 140 to destination nodes 150.

In an embodiment, the edge nodes and internal nodes 130 (collectively, network nodes) may be any devices or components that support transportation of the packets through the label switched network 101. For example, the network nodes may include switches, routers, or various combinations of such devices. Each network node may comprise a receiver that receives packets from other network nodes, a processor or other logic circuitry that determines which network nodes to send the packets to, and a transmitter that transmits the packets to the other network nodes. In some embodiments, at least some of the network nodes may be LSRs, which may be configured to modify or update the labels of the packets transported in the label switched network 101. Further, at least some of the edge nodes may be label edge routers (LERs), which may be configured to insert or remove the labels of the packets transported between the label switched network 101 and the external network 140.

The label switched network 101 may comprise a first P2MP LSP 105, which may be established to multicast data traffic from the first external network 140 to the destination nodes 150 or 160. The first P2MP LSP 105 may comprise the first ingress node 111 and at least some of the first egress nodes 121. The first P2MP LSP 105 is shown using solid arrow lines in FIG. 1. To protect the first P2MP LSP 105 against link or node failures, the label switched network 101 may comprise a second P2MP LSP 106, which may comprise the second ingress node 112 and at least some of the second egress nodes 122. The second P2MP LSP 106 is shown using dashed arrow lines in FIG. 1. Each second egress node 122 may be paired with a first egress node 121 of the first P2MP LSP 105. The second P2MP LSP 106 may also comprise some of the same or completely different internal nodes 130. The second P2MP LSP 106 may provide a backup path to the first P2MP LSP 105 and may be used to forward traffic from the first external network 140 to the first P2MP LSP 105 or second P2MP LSP 106, e.g., to egress node 123, when a network component of P2MP LSP 105 fails.

Figure 2:
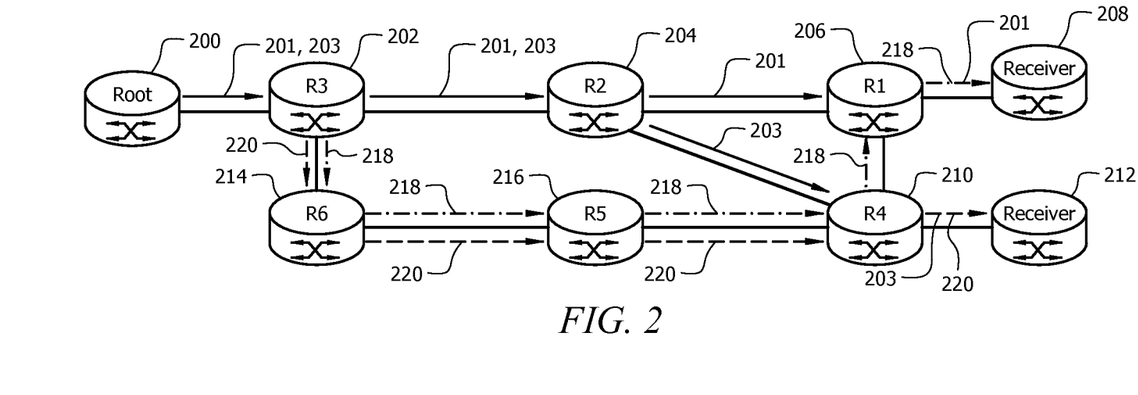
FIG. 2 depicts an embodiment of an illustrative network before failure of a protected node on the primary LSP.
Figure 3:
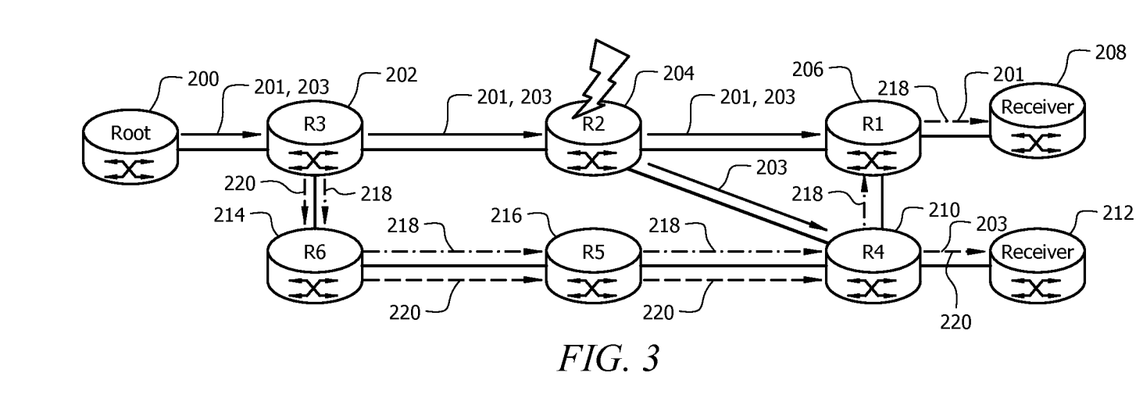
FIG. 3 depicts an embodiment of an illustrative network during failure of a protected node on the primary LSP.
Figure 4:
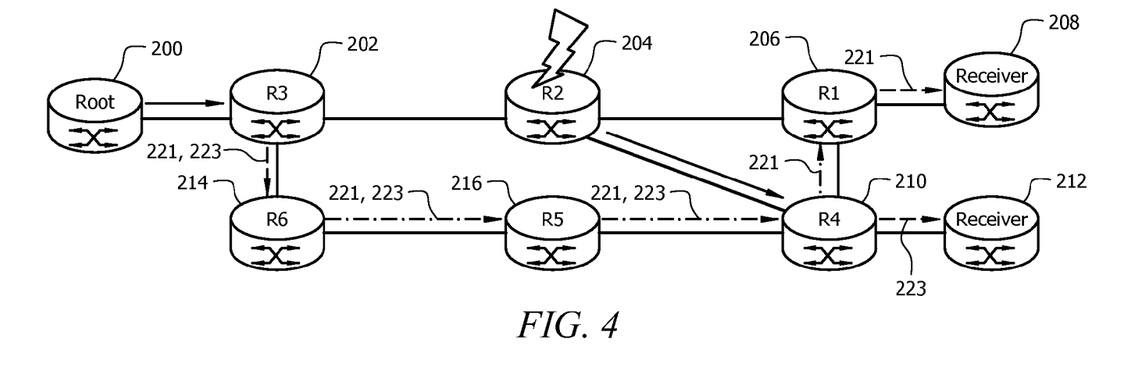
FIG. 4 depicts an embodiment of an illustrative network after failure of a protected node on the primary LSP.

FIGS. 2-4 depict an embodiment of an illustrative P2MP network map before, during and after a failure of a protected node. The components of FIGS. 2-4 may be substantially the same as the corresponding components of FIG. 1. The root 200 may transmit data through the internal nodes 202 (R3), 204 (R2), and 206 (R1) to the receiver 208. This path is referred to herein as the Primary Path 201. The root 200 may also transmit data through the internal nodes 202 (R3), 204 (R2), and 210 (R4) to the receiver 212. This path is referred to herein as the Primary Path 203. Nodes 206 (R1) and 210 (R4) may be called merge points of node 204 (R2).

Prior to failure, node 202 (R3) may inform node 204 (R2) of its protection protocol capability, e.g., by sending a notification message. Node 204 (R2) may subsequently inform node 202 (R3) of information related to merge points 206 (R1) and 210 (R4). The information may be sent, e.g., in the format depicted in FIGS. 5 and 6. This information may include, without limitation, the following information regarding nodes downstream of node 204 (R2): the number of merge point nodes, the merge point node address(es), label reserve time(s), and forwarding label(s). The data content and format of the information which node 202 (R3) may receive will be discussed further below. A first P2P backup LSP 218 may be established through internal nodes 202 (R3), 214 (R6), 216 (R5), 210 (R4) and 206 (R1) to receiver 208. The P2P backup LSP 218 may use label L1. Similarly, a second P2P backup LSP 220 may be established through internal nodes 202 (R3), 214 (R6), 216 (R5) and 210 (R4) to receiver 212. The P2P backup LSP 220 may use label L4.

FIG. 3 depicts the embodiment of FIG. 2 with a failure at node 204 (R2). When node 202 (R3) detects a failure of node 204 (R2), node 202 (R3) may enter a FRR scheme, e.g., by routing traffic through the first P2P backup LSP 218 using inner label L1 and through the second P2P backup LSP 220 using inner label L4. For packets on the first P2P backup LSP 218, node 210 (R4) may act as the Penultimate Hop Popping (PHP) node. For packets on the second P2P backup LSP 220, node 216 (R5) may act as the PHP node. The PHP node may remove, or pop, the backup tunnel labels, also called outer labels, for the packets, permitting nodes 206 (R1) and 210 (R4) to receive packets with the same forwarding information as pre-failure of node 204 (R2) from a different interface (although the packets may be received on a different port). Nodes 210 (R4) and 206 (R1) may thereafter receive and process packets from the PHP nodes once the PHP nodes have popped the backup tunnel labels in the same manner as if they were received on Primary Path 201 and Primary Path 203. The described series of tunneling, forwarding and penultimate hop popping may continue as long as a backup LSP is needed.

In one embodiment, at least one timer, also referred to herein as a reserve-timer or label reserve timer, associated with one or more leaf nodes may be maintained by a network component, e.g., by node 202 (R3). Upon failure of protected node 204 (R2) and establishment of the backup tunnels, the label reserve timer(s) may begin counting down. Expiration of the timer(s) may serve as a trigger event for cessation of packet forwarding on the relevant backup LSP(s) and node 202 (R3) may tear down the relevant P2P backup tunnel, e.g., by removing the forwarding state which is being protected by the FRR scheme. Node 202 (R3) may subsequently commence routing packets to receivers 208 and 212 through the new LSPs, depicted in FIG. 4. The reserve timer(s) may be set to less than about five seconds, less than about one second, or from about 5 to about 200 milliseconds.

In another embodiment, upon failure of Primary Path 201 and Primary Path 203 and commencement of packet forwarding through backup LSPs 218 and 220, node 202 (R3) may send notifications with a Make Before Break (MBB) "Request Status" code to nodes 206 (R1) and 210 (R4) requesting the status of MBB completion. After 206 (R1) and 210 (R4) complete the MBB sequence, 206 (R1) and 210 (R4) may send node 202 (R3) notification messages with status codes indicating completion of the MBB routine. Further information concerning MBB may be found in RFC 3209, titled "RSVP-TE: Extensions to RSVP for LSP Tunnels," which is incorporated herein by reference. Upon receiving a completion status code from 206 (R1) and/or 210 (R4), node 202 (R3) may remove the old forwarding state for backup LSP 220 and/or backup LSP 218, as applicable. Subsequently, node 202 (R3) may stop forwarding packets along the relevant P2P backup LSP as backup LSPs, and may commence routing packets through the relevant P2P backup LSPs as newly established primary LSPs 221 and 223, depicted in FIG. 4. Although shown as P2P backup LSPs, in another embodiment the backup paths are P2MP rather than P2P backup LSPs.

Figure 5:
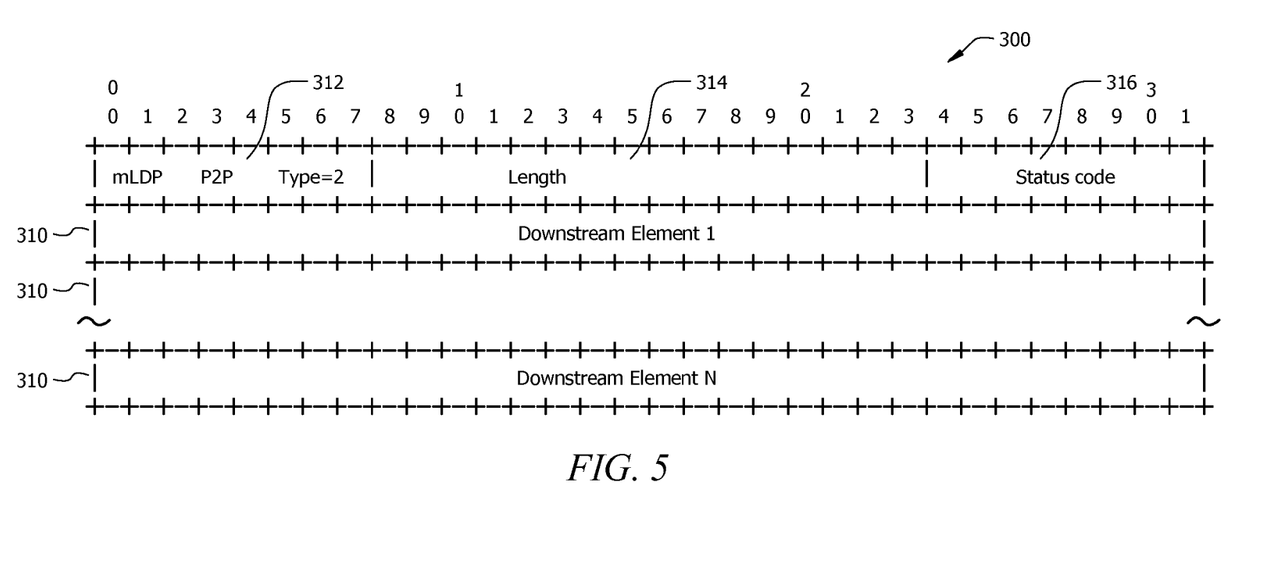
FIG. 5 depicts an embodiment of an illustrative LDP multi-point Status Value Element.

FIG. 5 depicts an embodiment of a new type of LDP MP Status Value Element (SVE) 300. The LDP MP SVE may utilize targeted-LDP (T-LDP) as documented in RFC 5036, titled "LDP Specification" and RFC 5561, titled "LDP Capabilities," which are hereby incorporated by reference. The LDP MP SVE 300 may contain one or more Downstream Elements 310, 1 through N, where N is an integer representing the number of applicable downstream LSRs. An LDP MP SVE 300 may be sent, e.g., from node 204 (R2) to node 202 (R3) in FIG. 2 to inform node 202 (R3) of the downstream nodes of node 204 (R2). The relevant LSRs for the LDP MP SVE 300 may be designated within the Downstream Elements 310. The "Type" field 312 may indicate the type of the LDP MP SVE 300, including without limitation types specified by the Internet Assigned Names Authority (IANA). For example, a '2' in the Type field 312 may indicate that the type-length-value (TLV) is for a MSLP P2P. The "Length" field 314 of the LDP MP SVE 300 may indicate the length of the SVE 300 in octets. The "Status Code" field 316 may indicate (e.g., using a first status code) whether the LDP MP SVE 300 advertises the existing downstream LSRs or (e.g., using a second status code) withdraws the deleted downstream LSRs.

Figure 6:
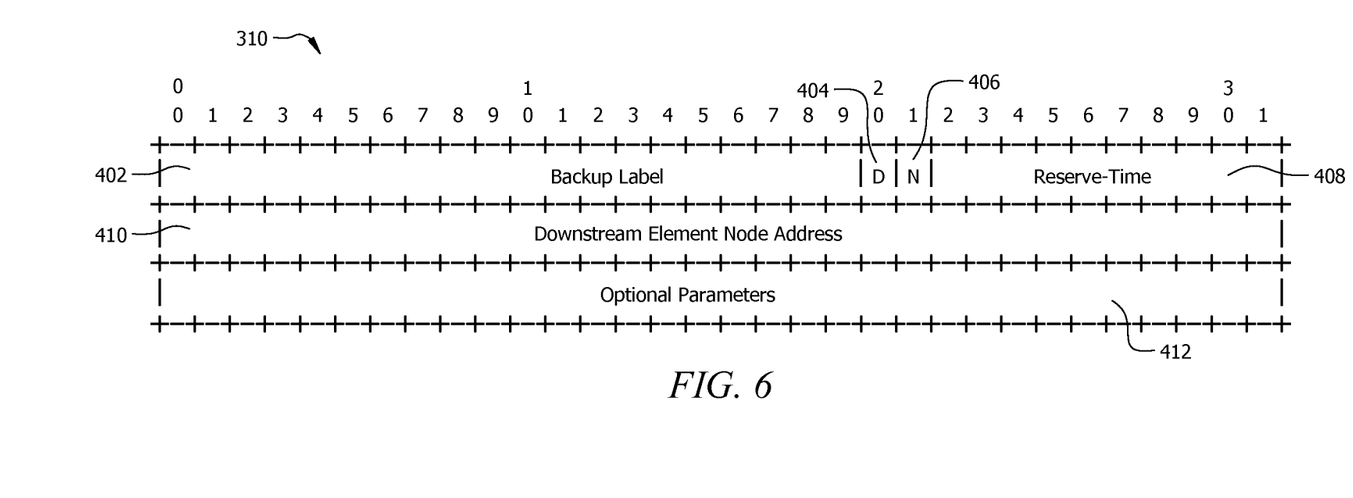
FIG. 6 depicts an embodiment of a Downstream Element of an LDP multi-point Status Value Element.

FIG. 6 depicts an embodiment of a Downstream Element 310 of a LDP MP SVE 300. "The "Backup Label" field 402 indicates the backup label assigned to the backup tunnel for the PLR. The "D Bit" field 404 may be a Delete Flag that indicates the type of deleting routine specified for the backup tunnel. A '1' in the D Bit field 404 may indicate an 'explicit-delete' routine, or deleting the backup tunnel following a MBB completion notification message received through targeted LDP (T-LDP). A '0' in the D Bit field 404 may indicate an 'implicit-delete' routine, or deleting the backup tunnel by reserve-timer expiration. The "N Bit" field 406 may be a Node Failure Required Flag that indicates the occasion of switching traffic's on PLR. A '1' in the N Bit 406 field may indicate a 'Yes', or that the PLR should switch traffic to a P2P backup path only when the PLR detects the node failure. A '0' in the N Bit field 406 may indicate a 'No', or that the PLR should switch traffic to a P2P backup path when PLR detects any failure. The "Res-time" field 408 may indicate the timer delay limit value for the reserve-timer. The Res-time field 408 may be effective when the D Bit field 404 is set as 'implicit-delete' and may be ignored when D bit field 408 is set as 'explicit-delete'. The "Downstream Node Address" field 410 may indicate the downstream node's LSR identification address. Downstream Element 310 may also contain an "Optional Parameters" field 412 to accommodate any optional parameters a system designer may desire to include.

Figure 7:
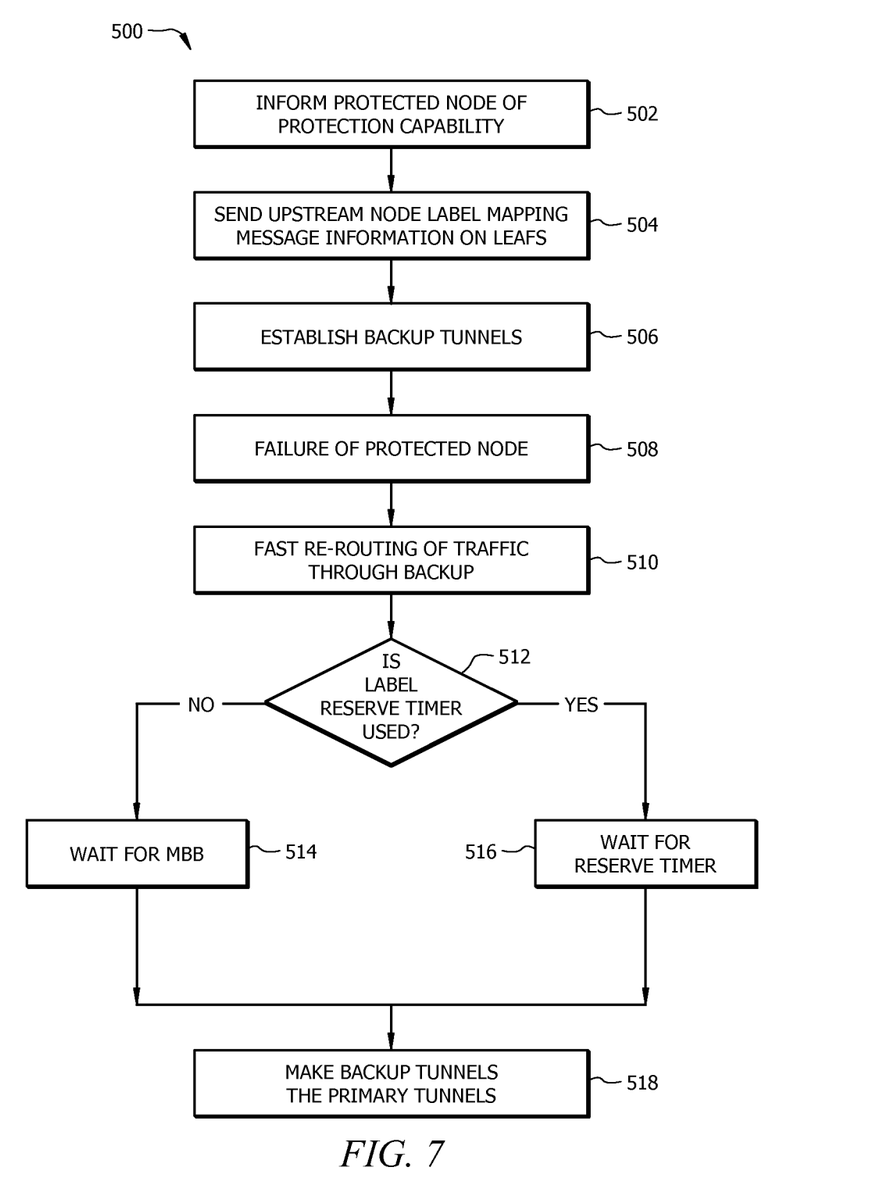
FIG. 7 is a flow chart of an embodiment of a point-to-point based multicast label distribution protocol local protection solution.

FIG. 7 depicts a flow chart of an embodiment of a point-to-point based multicast label distribution protocol local protection solution. Method 500 begins with informing a protected node of the protection capability of an upstream node, depicted at block 502. For example, in FIG. 2 node 202 may inform node 204 of its protection capability. The protected node responds to the upstream node by sending label mapping message information regarding its merge point nodes, depicted at block 504. For example, in FIG. 2 node 204 may inform node 202 of the number of merge point nodes, the merge point node addresses, label reserve times, and forwarding labels specific to nodes 206 and 210. With the information received from the protected node, the upstream node may establish backup tunnels to serve the downstream nodes in the event of a failure of the protected node, depicted at block 506. In one embodiment, the backup tunnels can be P2P or P2MP LSPs. For example, in FIG. 2 node 202 may establish backup LSPs 218 and 220. Upon failure of the protected node, depicted at block 508, the upstream node may initiate a FRR protocol to route traffic through the backup tunnels to the merge point nodes, depicted at block 510. For example, in FIG. 3 node 202 may route traffic to nodes 206 and 210 using backup LSPs 218 and 220 following failure of node 204. The flowchart splits at block 512 based on whether the system utilizes a label reserve timer. In another embodiment, both the label reserve timer and the MBB status monitor criteria are used. In FIG. 7, if a label reserve timer is used the upstream node waits for the reserve timer to timeout, depicted at block 516. For example, in FIG. 3 node 202 may wait a predefined time specified in the information passed from node 204 for the downstream nodes 206 and/or 210. If a label reserve timer is not used, the upstream node may wait for a status update from the downstream nodes indicating that the backup tunnel is established using a MBB protocol. For example, in FIG. 3 node 202 may wait for a status update message from nodes 206 and/or 210 or other indicia indicating that the backup LSPs 218 and/or 220 are established. Upon expiration of the label reserve timer for a downstream node or upon confirmation of MBB completion from a downstream node, the upstream node makes the appropriate backup tunnel(s) the new primary tunnel(s), depicted at block 518. For example, in FIG. 4 node 202 may transmit data along LSPs 218 and 220 which may be designated the new primary LSPs for nodes 206 and 210 by removing the secondary forwarding states, e.g., by deleting the associated backup label. In one embodiment, each downstream node has a label reserve timer value specific to the downstream node. In another embodiment, all downstream nodes are served based on the same label reserve timer.

Figure 8:
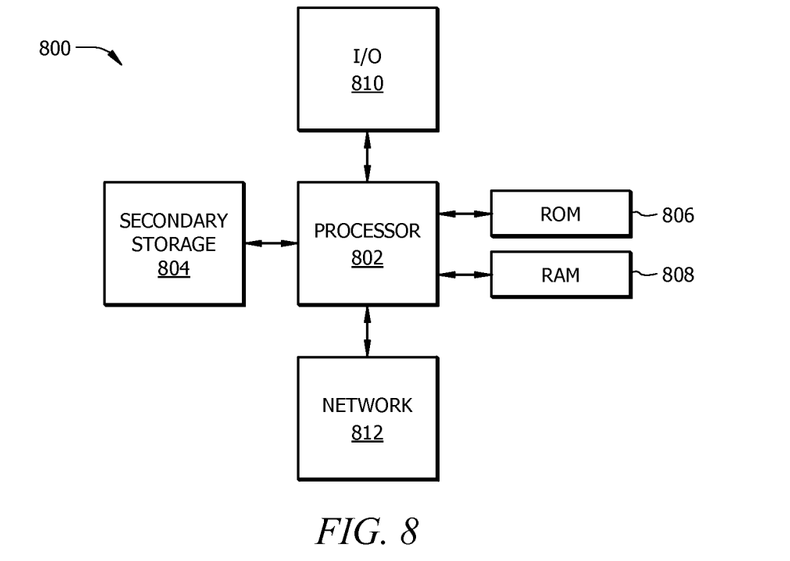
FIG. 8 depicts a typical, general-purpose network component suitable for implementing one or more embodiments of the disclosed components.

The schemes described above may be implemented on any general-purpose network component, such as a computer or network component with sufficient processing power, memory resources, and network throughput capability to handle the necessary workload placed upon it. FIG. 8 illustrates a typical, general-purpose network component or computer system 800 suitable for implementing one or more embodiments of methods disclosed herein, such as one or more steps of method 500. The general-purpose network component or computer system 800 includes a processor 802

(which may be referred to as a central processor unit or CPU) that is in communication with memory devices including secondary storage 804, read only memory (ROM) 806, random access memory (RAM) 808, input/output (I/O) 810 devices, and network connectivity devices 812. The processor 802 may be implemented as one or more CPU chips, or one or more cores (e.g., a multi-core processor), or may be part of one or more application specific integrated circuits (ASICs) and/or digital signal processors (DSPs). The processor 802 may be configured to implement any of the schemes described herein which may be implemented using hardware, software, or both. General-purpose network component or computer system 800 may comprise an mLDP node or a P2P LDP node.

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a processor configured to:
signal to a downstream node that an upstream node is capable of receiving node protection backup route data;
receive the node protection backup route data at the upstream node, wherein receiving the node protection backup route data occurs in response to the signal; and
determine at least one backup route to at least one merge point node of a protected link or node according to the node protection backup route data,
wherein the processor is further configured to transmit data along the backup route using forwarding information contained in the node protection backup route data following failure of the protected link or node, and cease transmitting data along the at least one backup route using the forwarding information following a trigger event, and
wherein the trigger event is selected from one of expiration of label reserve timer and receipt of a make before break (MBB) route completion status message.

2. The apparatus of claim 1, wherein the processor is further configured to:
redesignate the backup route as a new primary route;
select a second protected link or node; and
repeat one or more of the prior steps for the second protected link or node.

3. An apparatus comprising:
a processor configured to:
receive at an upstream component information from a downstream component, wherein the received information comprises one or more of the following data elements related to one or more merge point nodes of a protected node: a number of merge point nodes, a plurality of merge point node addresses, a plurality of merge point node label reserve times and a plurality of merge point node forwarding labels; and
establish a backup tunnel at the upstream component using at least one of the data elements received from the downstream component, wherein the information includes at least the merge point node label reserve time, and the processor is further configured to transmit data from the upstream component to a leaf on a backup tunnel following failure of the protected node, and stop backup tunnel transmission when a timer at the upstream component reaches the specified merge point node label reserve time, and wherein the processor is further configured to transmit data from the upstream component to the merge point node on the backup tunnel following failure of the protected node, receive a rerouting completion status message from the merge point node at the upstream component, and stop the backup tunnel transmission.

4. The apparatus of claim 3, wherein the downstream component is the protected node.

5. The apparatus of claim 3, wherein the processor is further configured to notify the downstream component of the capability of the upstream component to receive and utilize the data elements for establishing the backup tunnel.

6. The apparatus of claim 3, wherein the merge point node label reserve time is less than one second.

7. The apparatus of claim 6, wherein the merge point node label reserve time is from about 5 to about 200 milliseconds.

8. The apparatus of claim 3, wherein the rerouting completion status message is a make before break (MBB) completion status message.

9. A method of optimizing secondary forwarding path operations comprising:

receiving at a Point of Local Repair (PLR) a fast re-routing (FRR) label mapping message associated with a merge point (MP), wherein the MP is downstream of a protected node;

generating a backup forwarding label switching path (LSP) for a primary LSP, wherein the backup LSP does not include the protected node;

binding the backup forwarding LSP to the primary LSP;

switching traffic to the backup forwarding LSP upon detection of failure of the protected node; and deleting the backup forwarding LSP when the backup forwarding LSP is no longer needed upon confirmation of make before break (MBB) completion, wherein the FRR label mapping message associated with the MP is received at the protected node, an upstream label switched router (LSR) of the protected node is determined, and at least one MP downstream of the protected node is notified, and wherein the primary and secondary LSPs are determined at the MP upon receiving notification from the protected node.

10. The method of claim 9, further comprising sending out the label mapping message to the PLR.

11. The method of claim 10, wherein the label mapping message includes a label distribution protocol (LDP) multipoint (MP) Status type-length-value (TLV) that carries a FRR Status Code indicating the primary LSP and the backup LSP.

12. The method of claim 11, wherein the labels assigned for the primary LSP and the backup LSP are different.

13. The method of claim 9, wherein the MP is prohibited from choosing the protected node as its upstream LSR on the backup LSP.

\* \* \* \* \*

UNITED STATES PATENT AND TRADEMARK OFFICE
CERTIFICATE OF CORRECTION

| | | |
|---|---|---|
| PATENT NO. | : 9,036,642 B2 | Page 1 of 1 |
| APPLICATION NO. | : 13/648087 | |
| DATED | : May 19, 2015 | |
| INVENTOR(S) | : Qianglin Quintin Zhao et al. | |

It is certified that error appears in the above-identified patent and that said Letters Patent is hereby corrected as shown below:

On the Title Page:

(71) Applicant: Delete "Futurewei Technologies, Co., Plano, TX (US)" and insert
-- Futurewei Technologies, Inc., Plano, TX (US) --

(74) Attorney, Agent or Firm - Delete "Conley Rose, P.C.; Grant Rodolph; William H. Deitrich" and insert -- Conley Rose, P.C.; Grant Rodolph; William H. Dietrich --

Signed and Sealed this
Second Day of February, 2016

Michelle K. Lee
*Director of the United States Patent and Trademark Office*